Figure 2:
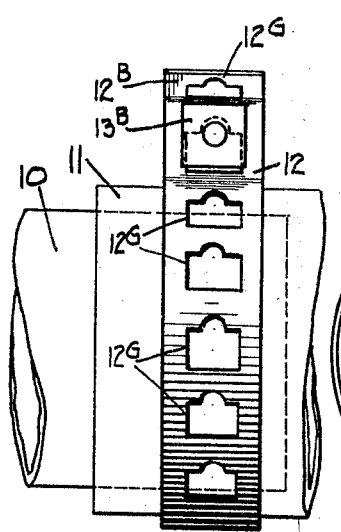

May 11, 1926.

C. VITEK

CLAMP

Filed July 19, 1923

1,584,497

INVENTOR
Charles Vitek
BY Frank J Schraeder Jr
Attorney.

Patented May 11, 1926.

1,584,497

UNITED STATES PATENT OFFICE.

CHARLES VITEK, OF CHICAGO, ILLINOIS.

CLAMP.

Application filed July 19, 1923. Serial No. 652,516.

This invention relates to improvements in hose clamps.

An object of the invention is to provide a hose or pipe clamp in which, through simple manipulation of an adjusting screw, the entire circumference of the outer hose or pipe, and particularly the side walls of the same, are firmly gripped and pressed against the inner one.

Another object of the invention is to provide means in this clamp for quickly releasing the clamp from the side walls when it is desired to disconnect one of the tubular members from the other.

It is, furthermore, an object of the invention to provide a novel form of a hose clamp, which can be manufactured at very small expense, and which can be manipulated in a very simple way for fastening two tubular members at their telescoping ends to each other.

With these and other objects in view, an embodiment of the invention is illustrated in the accompanying drawing, and is described in the following specification, the novel features being pointed out in the appended claim.

Figure 1:
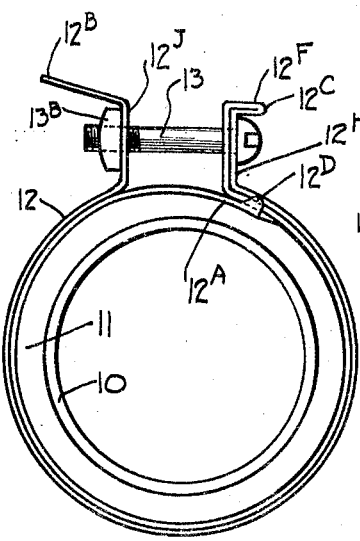
Figure 3:
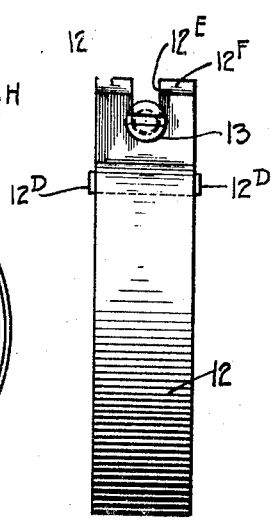

In the drawings:

Fig. 1 is an end elevation of a clamp embodying my invention and Figures 2 and 3 are side elevations of same.

Referring to the drawings which illustrate one form of my invention, the clamp is here shown as connecting or clamping a pipe 10 telescoped within a hose 11, and the structure shown comprises a continuous flexible band 12 of steal or other suitable material, formed into a ring with the material doubled or folded over itself providing a very strong clamp.

In making the clamp, the band 12 is folded over itself from a point $12^C$ approximately midway its ends, the end $12^A$ forming the inner band being slightly longer than the nut retaining end $12^B$ and being provided at its very end, with a pair of prongs $12^D$ which embraces the edges of the band to avoid any misalignment or twisting of this end.

At the point of bending, $12^C$, the doubled band is bent for a short distance on approximately a radial line from the center of the clamp to form a short vertical wall $12^H$ for the head of the tightening bolt 13, and the upper end of this wall is slotted at $12^E$ to receive the shank of the bolt 13 with the head $13^A$ in engagement with the wall. In order to strengthen this wall $12^C$, the upper ends on both sides of the slot $12^E$, are bent laterally at right angles to the wall forming stiffening flanges.

The end $12^B$ is provided with a plurality of slots $12^G$, to afford adjustability of the clamps to slightly varying diameters.

For convenience in shipping and assembling, the end of the bolt may be pinned after the insertion of the nut thereon. This also prevents the loss of the nut, and as the clamp is designed for assembling with the nut on the bolt, the advantages are readily apparent.

The slots $12^G$ are here preferably made wide enough to afford an assembly of the bolt and clamps by the insertion of the bolt head $13^A$ first through the slot $12^G$ and then over the flanged ends $12^F$ into slots $12^E$ for engagement with the wall $12^H$.

In adjusting the clamp as to diameter, the proper slot $12^G$ is first determined and the band can then be readily bent upward with a pair of pliers to form the abutment wall $12^J$ for the nut $13^B$.

I claim:

A clamp comprising a single continuous band of flexible material folded over itself and forming substantially a double band, tightening means extending between the end of the outer band portion and the folded portion of the band, said end of the outer band portion having a plurality of means adapted for engagement by said tightening means to provide diametrical variation of the clamp, the end of the inner band portion extending under a portion of the doubled band and bridging the space between the folded point and the outer band portion, and means integral with said end of the inner band portion for retaining the end of said inner band in alignment with the doubled band-portion.

In witness whereof I affix my signature.

CHARLES VITEK.